UNITED STATES PATENT OFFICE.

HERMAN FLECK, OF GOLDEN, COLORADO, ASSIGNOR TO THE NATIONAL ONION SALT COMPANY, OF DENVER, COLORADO, A CORPORATION OF COLORADO.

SEASONING MATERIAL AND PROCESS OF MAKING SAME.

1,038,334.

Specification of Letters Patent. Patented Sept. 10, 1912.

No Drawing. Application filed May 18, 1912. Serial No. 698,274.

*To all whom it may concern:*

Be it known that I, HERMAN FLECK, a resident of Golden, in the county of Jefferson and State of Colorado, have invented certain new and useful Improvements in Seasoning Material and Processes of Making Same, of which the following is a specification.

Many vegetables such, for instance, as onion, celery, horse radish and garlic are commonly used as seasoning and flavoring materials and various attempts have been made to prepare compounds in dry pulverulent form from these vegetables and which will have the desired characteristic taste and odor. All of the methods heretofore proposed involve desiccation by either the evaporation of the juice while associated with the ground or finely subdivided vegetable fiber and with or without a foreign substance such as salt or the evaporation of the juice after it has been pressed out of or separated from the vegetable fiber.

Vegetables of the character above referred to include a large number of constituents which may be divided roughly into four classes. First, the vegetable fiber composed largely of cellulose, second, water and other volatile liquids, third, soluble carbohydrates, salts and other compounds and fourth, the essential oils and principles which primarily give the vegetable its distinctive flavor or odor. It is only these essential oils and principles which are required to give the prepared product its flavoring or seasoning quality and the other constituents if present in the product are either deleterious or valueless or serve merely as a carrier.

In carrying out my invention I discard the valueless and deleterious constituents of the vegetable without the loss of any of the desirable or essential constituents and in so doing greatly improve the product as well as reduce the cost of manufacture.

Briefly my invention involves the bodily separation of the aqueous portions of the juice and the carbohydrates and other soluble constituents in the juice from the fiber and oils and the desiccation of only said fiber and oils preferably with the addition of salt and with or without coloring matter.

I save time and reduce cost of manufacture by reason of the fact that I do not have to evaporate the aqueous portions of the juice and do not have to dry the syrupy, amorphous and difficultly crystallizable carbohydrates, and other soluble portions of the juice. By shortening the time of heating I reduce the loss of essential oils by mechanical distillation by oxidation and by fermentation and reduce the liability of discoloration of the product from long contact with iron vessels. By eliminating the amorphous and difficultly crystallizable carbohydrates I facilitate the grinding of the resultant product, render said product less hygroscopic, more granular, and more free from dust, and avoid deterioration of the final product by changes in the composition caused probably by fermentation or oxidation of the carbohydrates particularly upon the absorption of moisture. By preserving the fiber in the final product I provide a natural absorbent and carrier for the oils which will dilute them and reduce the quantity of salt which would otherwise be needed. Furthermore the fiber evenly and slowly distributes the flavor to the organs of taste and smell.

My invention is applicable to various different vegetables commonly used for seasoning or flavoring but for purpose of illustration I will set forth the invention in detail in connection with only one vegetable, namely the onion but I wish it particularly understood that my invention is not limited for use with this particular vegetable.

In the preferred method of carrying out my invention I first remove the outer skins of the onion which are separately treated for the production of a natural dye-stuff to be added later to the product. This treatment preferably consists merely in boiling the skins with water to form a dye extract of a brown color which may be concentrated to any desired degree by boiling. The cleaned and peeled onions are then ground, mashed or comminuted in any other suitable manner, to a shredded pulp consisting of fiber and juices. The mass is then mixed with a suitable quantity of a solvent for the essential oils and principles, which solvent is substantially non miscible with water. The solvent is also preferably non-toxic, of low boiling point and of neutral reaction.

I do not desire to be limited to any particular solvent although a coal tar product known as benzole may be advantageously employed. The quantity of solvent will, of course vary with the character of the solvent but if benzole be employed one-tenth volume will ordinarily be sufficient. The fiber, juice and solvent are then agitated in any suitable manner so as to become thoroughly intermixed. The mixing may begin simultaneously with the grinding by adding the solvent to the onion during the time of the grinding operation. The entire mass with the solvent is either centrifugated or pressed so that the aqueous portions of the juice and the solvent containing the essential oils are separated from the fiber. The fiber is then washed with water and again centrifugated or pressed. The mixed solvent and aqueous parts are allowed to settle, the solvent retaining the essential oils rising to the top while the water containing the other soluble constituents of the onion settles to the bottom. The solvent containing the essential oils is then separated from the aqueous part in any suitable manner as for instance by drawing off the latter and is then mixed with the washed and partially dried fiber and a proper and suitable portion of salt. A coloring material and preferably that formed from the onion skins as above described may be added and the mass is stirred and heated at low temperature in closed vessels or stills whereby the solvent is distilled off and recovered while the essential oils or principles remain mixed with the salt, fiber and coloring matter. The semi-dried mass is then withdrawn from the still and further dried in a suitable drying apparatus. It may be shipped in this form but preferably it is crushed and screened to produce the final product suitable for use in the ordinary dredge or salt shaker.

It will be noted that in carrying out my improved process there is a separation of the constituents of the onion into three parts, namely the fiber, the essential oils and the portions of the juice which are not essential to the seasoning material and that the last mentioned part is discarded while the fiber and the oils are preserved. By separating out the water in this manner instead of evaporating it I greatly shorten the time required in the manufacture of the product and reduce the cost of manufacture. The water carries a large number of non crystallizable or difficulty crystallizable substances which would have either no value in the product or produce a deleterious effect. I avoid the expense and time required in the evaporation or desiccation of these constituents and prevent discoloration of the product by long contact of these constituents or others with the iron of the vessels in which the material is treated. By shortening the time and removing these constituents I avoid fermentation which might occur during the process of manufacture as well as in the final product and render the final product substantially non-hygroscopic. By extracting the oils from the water by a solvent rather than by evaporation I avoid loss of the oils during the long drying operation which would otherwise be necessary and prevent the oxidation of the oils due to long contact with the other constituents. The onion fiber constitutes a natural carrier for the essential oils and is not permanently affected by changes in the temperature or humidity conditions of the atmosphere. The fiber and salt adhere to each other so that the mass remains uniform both as to composition and the size of the constituent particles. The mass is free from dust and possesses a natural color which may be controlled at will by regulating the quantity of coloring matter added. A less quantity of salt is required as neither the fiber nor the essential oils require a preservative to prevent decomposition.

Having thus described my invention what I claim as new and desire to secure by Letters Patent is:

1. A composition of matter in the form of dry particles adapted for use as a seasoning and flavoring material and comprising vegetable fiber, the essential oils of the vegetable and salt, the compound being substantially free from the solid constituents of the vegetable which are soluble in water.

2. A composition of matter adapted for use as a seasoning and flavoring material and comprising solvent extracted essential oils and principles of a vegetable in combination with common salt, said composition being in dry pulverulent form.

3. A composition of matter in dry pulverulent form adapted for use as a seasoning and flavoring material comprising solvent extracted essential oils and principles of a vegetable, a finely subdivided fibrous carrier for said oils and principles and common salt.

4. A composition of matter adapted for use as a seasoning and flavoring material comprising solvent extracted essential oils and principles of a vegetable intimately associated with common salt, said composition being substantially free from those solid constituents of the vegetable which are freely soluble in water.

5. A composition of matter adapted for use as seasoning and flavoring material containing the essential oils and principles of a vegetable and a fibrous carrier free from those solid constituents of the vegetable which are soluble in water.

6. A composition of matter adapted for use as seasoning and flavoring material containing the essential oils and principles of a vegetable, a fibrous carrier free from natural ingredients soluble in water and common salt.

7. A composition of matter adapted for use as a seasoning and flavoring material comprising the essential oils and principles of onion, onion fiber free from constituents soluble in water and common salt.

8. A composition of matter adapted for use as a seasoning and flavoring material comprising the essential oils and principles of onion, onion fiber free from constituents soluble in water, common salt and a coloring matter formed from the onion peel.

9. A composition of matter adapted for use as a seasoning and flavoring material comprising the essential oils and principles of onion, free from those constituents of the onion soluble in water, a dry finely comminuted carrier therefor and common salt.

10. The process of making a seasoning material which consists in comminuting a fresh vegetable separating the juices therefrom, extracting the essential oils and principles from the juices by a suitable solvent and mixing the extracted part with fiber of the vegetable and desiccating.

11. The process of making a seasoning material which consists in comminuting a fresh vegetable separating the juices therefrom, extracting the essential oils and principles from the juices by a suitable solvent and mixing the extracted part with fiber of the vegetable and extracting the solvent by desiccating.

12. The process of making a seasoning material which consists in comminuting fresh vegetables, separating the pulp from the juices, separating the essential oils from the juices and reuniting the essential oils and the pulp.

13. The process of making a seasoning material which consists in comminuting fresh vegetables, separating the pulp from the juices, and recombining the pulp with common salt and the essential oils of the vegetable.

14. The process of making a seasoning material which consists in comminuting fresh vegetables, separating the pulp from the juices, separating the essential oils from the juices, recombining the essential oils with the pulp and salt, desiccating and comminuting.

15. The process of making a seasoning material which consists in removing the outer skins of vegetables, preparing a dye extract from said skins, preparing a mass including salt vegetable fiber and the essential oils of the vegetable mixing said dye extract therewith, desiccating and comminuting.

16. The process of making a seasoning material which consists in comminuting onion, separating the pulp from the juices, mixing the pulp with salt and the essential oils of onion, drying and comminuting.

17. The process of making a seasoning material which consists in removing the outer skins of onions, preparing the dye extract from said outer skins comminuting the body portion of the onion, separating the pulp from the juices, mixing the pulp with salt, the essential oils of onions and said dye extract and desiccating.

Signed at Denver in the county of Denver and State of Colorado this 14th day of May, A. D. 1912.

HERMAN FLECK.

Witnesses:
RODNEY J. BARDWELL,
ROY C. HECOX.